Jan. 27, 1959   C. A. HEMPHILL   2,870,748
ROTARY ACTUATOR
Filed June 30, 1953   2 Sheets-Sheet 1

Carl A. Hemphill
INVENTOR.

BY *James M. Clark*

HIS PATENT ATTORNEY.

Jan. 27, 1959 C. A. HEMPHILL 2,870,748
ROTARY ACTUATOR
Filed June 30, 1953 2 Sheets-Sheet 2
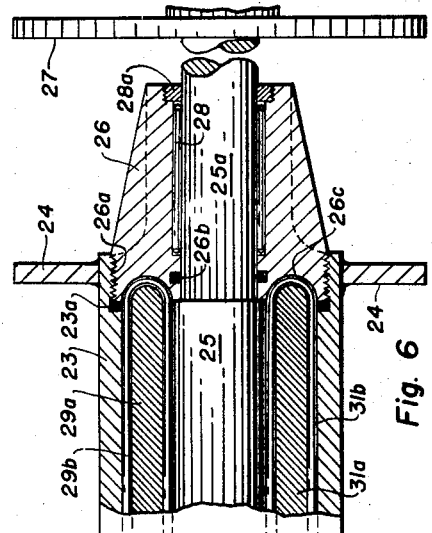
Carl A. Hemphill
INVENTOR.
BY
HIS PATENT ATTORNEY.

United States Patent Office 2,870,748
Patented Jan. 27, 1959

2,870,748
ROTARY ACTUATOR

Carl A. Hemphill, Los Angeles, Calif., assignor to North American Aviation, Inc.

Application June 30, 1953, Serial No. 365,079

5 Claims. (Cl. 121—97)

This invention relates to actuating motors and more particularly to improvements in fluid actuators of the rotary type adapted for the movement of control surfaces and other components of aircraft and other vehicles.

The present invention is directed to improved rotary fluid actuators of relatively small diameter and of appreciable axial length making the actuators particularly well suited for the support and actuation of aircraft control surfaces. The improved actuating motors of the present invention are of such compact and sturdy construction that they are especially adapted to be disposed upon the hinge line of the control surface and to support the latter directly from their movable or rotor portions while being completely housed or faired within the control surface and its adjacent airfoil. The improved actuators are particularly fitted for the operation of the control surfaces of high speed aircraft, their hydraulic operation assisting the pilot in requiring but relatively small pilot forces and they provide control surface actuating means which are readily damped and free from flutter. It is a further important objective of the present invention to provide an improved arrangement of torus-shaped pistons within annular working chambers and a particularly effective and efficient seal arrangement for the peripheries of the pistons or vanes.

Other advantages and objects of the present invention will become apparent to those skilled in the art after reading the following description, taken in conjunction with the accompanying drawings, forming a part hereof, in which.

Figure 1:
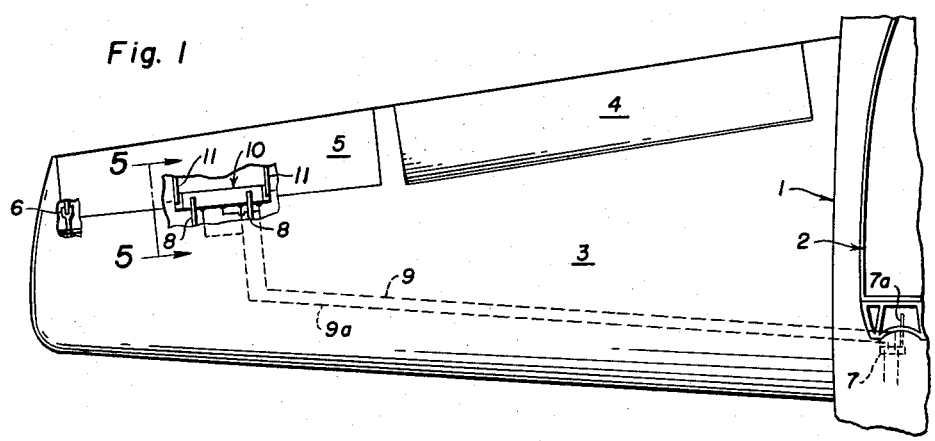
Fig. 1 is a plan view of a portion of an aircraft to which a form of the improved actuator is shown applied to the operation of an aileron.
Figure 2:
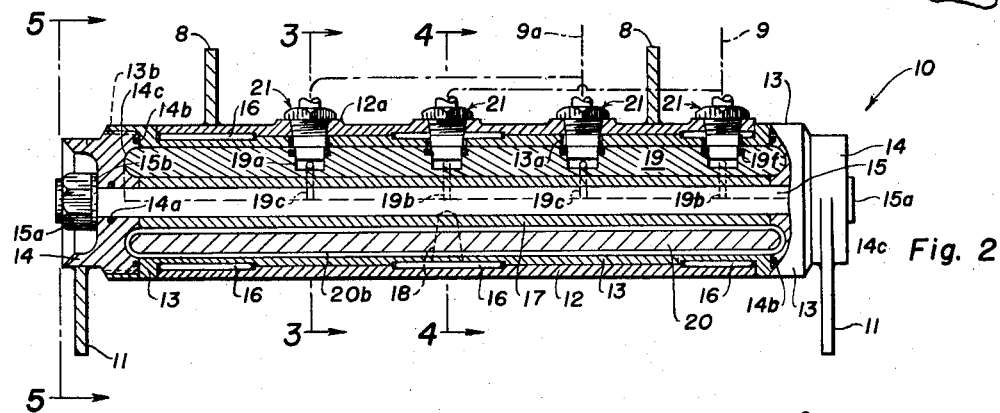
Fig. 2 is a sectional bottom plan view of the actuator shown in Fig. 1.
Figure 4:
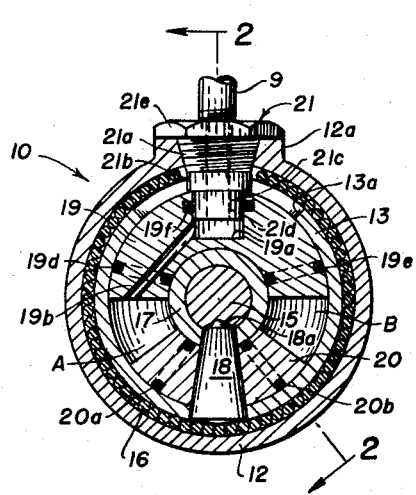
Figure 3:
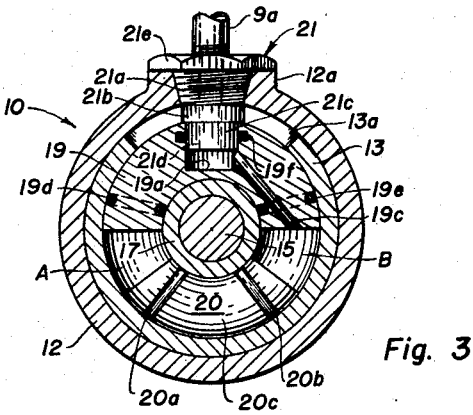

Fig. 3 is a transverse sectional view of the same to a larger scale as taken along the lines 3—3 of Fig. 2 with member 20 and its accompanying O-rings 20a and 20b not cutaway;

Fig. 4 is a similar transverse sectional view as taken along the lines 4—4 of Fig. 2;

Fig. 5 is an end elevational view of the actuator and the adjacent portions of the aileron and wing as taken along the lines 5—5 of Figs. 1 and 2;

Fig. 6 is an enlarged part-sectional view of a modified form of actuator;

Fig. 7 is a transverse sectional view of the same as taken along the lines 7—7 thereof; and Fig. 8 is a sectional view of the end portion of a further form of fluid actuator.

Referring now to Fig. 1, the numeral 1 represents an aircraft body or fuselage having a control compartment or cockpit 2 disposed therein and from which there laterally extends the wing or airfoil 3. At the trailing portion of the wing 3, there is mounted a conventional flap 4 and adjacent the wing tip portion and inset within the trailing edge, there is hinged an aileron or lateral control surface 5. The aileron 5 may be pivotally supported from the wing 3 by a plurality of otherwise conventional hinge mountings 6, although in certain installations these mountings may be dispensed with where the aileron is actuated and hingedly mounted by means of the improved fluid actuator indicated at 10. The latter is preferably connected by suitable piping or conduits to a valve disposed within the cockpit 2 and actuated by movements of the conventional control stick to which the valve 7 is suitably interconnected by means of the mechanism 7a. The valve 7 communicates with the actuator 10 by means of the fluid conduits 9 and 9a, one of which will transmit fluid under pressure and the other will provide the fluid return or relief line for movement of the aileron 5 in a given direction, and vice versa. As will be more fully explained below, the fixed portion of the actuator 10 has attached thereto the bracket arms or fins 8 which extend into and are fixedly attached to the wing 3, and the movable end portions of the actuator have fixed thereto the movable brackets or fins 11 which are attached to the aileron structure.

Referring now to Figs. 2 to 5, inclusive, the fluid actuator 10 comprises essentially an elongated annular working chamber or cylinder of relatively small diameter for its extensive axial length. The annular cylinder is defined on the one hand by the fixed outer casing 12, fixedly supported from the brackets or fins 8, and the adjacent movable cylindrical liner 13 which is rotatably mounted within the fixed outer casing 12 inside the intermediate needle bearings 16. The wall thickness of each tubular element is preferably reduced to provide space for the bearings 16 for which they provide the inner and outer races. The fixed and movable cylinder portions 12 and 13, respectively, form the outer wall of the annular cylinder or working chamber and the inner limit of the chamber is defined by the relatively movable central shaft or rod 15 upon which is attached the tubular sleeve or spacer element 17. The latter could, alternatively be formed integrally with the shaft 15 as in the subsequent modifications. The ends or heads of the annular cylinder are provided by the end plug portions 14 which are drawn inwardly of the cylinder against the spacer tube 17 by the nuts 15a engaging the threaded ends of the central rod 15 bearing against the intermediate washers 15b. The end plug portions 14 are provided with suitable fluid O-ring seals at 14a and 14b and are formed with torus-shaped inner portions 14c defining toroidal shaped-ends for the chamber. The movable outer cylinder 13 is provided with internal splines 13b at its ends which are engaged by the complementary external splines formed on the end plug members 14 to thereby prevent relative rotation between the portions 13 and 14. In drawing the end caps or plugs 13 and 14 together by tightening the nuts 15a the central sleeve 17 as indicated above, serves as a spacer to define the end limits of the toroidal-shaped annular chamber.

Within this annular toroidal chamber, there is provided a fixed abutment or piston 19 and a movable piston or vane 20. The piston 19, which may preferably extend in an arc of approximately a semi-circle about the inner sleeve 17, is fixed to the outer casing 12 by means of the screw plugs 21 which engage the tapped boss portions 12a of the casing. The movable cylinder wall portion 13 is provided with a plurality of transverse slots 13a to provide clearance around the cylindrical shank portions 21b of the screw plugs 21 in order that the movable cylinder 13 may be rocked outside the fixed piston 19 and about the axis of the actuator. The fixed piston 19 is provided with a plurality of radially extending bores 19a open to its outer face to receive the cylindrical end portion 21c of the screw plugs 21, and the latter are suitably bored at 21d to provide communication between the pipes 9 and the ducts 19b on the one hand, and the pipes 9a in communication with the ducts 19c on the other. It will be noted that the alternate pipes 9 and ducts 19b communicate with the left chamber portion A as viewed in Figs. 3 and 4, whereas the remaining alternate pipes 9a communicate through the screw plugs with the ducts 19c which open into the right chamber portion B. It will be understood that the pipes or conduits 9 and 9a are properly engaged with the terminal fittings or screw plugs 21, by the threads 21a as shown, or by other adaptable means, and the screw plugs are preferably tightened within the threaded bosses 12a by a suitable wrench, or other tool, applied to the hexagonal head portions 21e. O-ring seals 19f may preferably be provided to seal the cylindrical contacting surfaces between the end portions 21c of the screw plugs and the walls of the recesses 19a by which these end portions 21c fix the piston 19 to the casing 12. The piston 19 is provided with rounded or torus-shaped end portions and is also provided with a pair of peripheral grooves in radially extending planes within which are carried the seals 19d and 19e of O-ring type, or circular cross-section.

To the movable cylindrical liner 13, as well as to the central rod 15 and its surrounding sleeve or tube 17, there is fixedly anchored or attached the movable piston 20 by means of one or more tapered pins or plugs 18, the conic pointed ends 18a of which are seated within a complementary recess provided in the central rod 15. The movable piston 20 is also provided with toroidal-shaped end portions 20c which fit closely against the surfaces 14c of the end plugs 14 and is also provided with O-ring seals 20a and 20b. It will be noted that the fixed piston 19 is held in position upon the tubular element 17, which is free to rock or oscillate within the fixed piston, and the encircling cylindrical liner 13 is also rockable about the fixed piston 19. Accordingly, the O-ring seals 19d and 19e are supported within a fixed member and have cylindrical surfaces, both inside and outside, rotating across these seals in the same direction, whereas the seals 20a and 20b in the movable piston 20 are fixed or static seals, inasmuch as the adjacent surfaces of the tubular element 17 and the cylindrical liner 13 are both fixed to and move with the piston 20.

The operation of the improved two-chamber actuator 10 as applied to the aileron of Fig. 1 is as follows: Should it be desired to depress or deflect the aileron 5 downwardly from the neutral position shown in each of the figures, the control stick is moved in the corresponding direction and through the interconnecting mechanism 7a operates the valve 7 to connect the conduit 9 with the source of hydraulic fluid pressure. The fluid under pressure enters the screw plugs 21 as shown in Fig. 4 passing through the central bore 21b and out through the passages 19b into the chamber A causing the movable piston 20 to rotate in the counterclockwise direction to thereby move the aileron 5 downwardly with it by virtue of the arms 11 which are attached to the movable portion of the actuator and to the aileron structure. As the piston 20 rotates in the counterclockwise direction, fluid is expelled from the right hand chamber B, being forced out through the passage 19c, as shown in Fig. 3, and outwardly through the screw plug 21 and the relief conduit 9a, to be returned to the reservoir of the hydraulic system. The components are shown in the neutral position in Figs. 3 and 4, corresponding to Fig. 5, from which the aileron may be deflected some 25°, or more, in each direction. In the event it is desired to return the aileron to the neutral position or to move the aileron upwardly, it will be obvious that the reverse of the above described operation will take place.

Referring now to the modification shown in Figs. 6 and 7, the numeral 22 designates another form of hydraulic actuator having a fixed outer casing 23 to the ends of which are attached the wing fins or arms 24, and which casing is internally threaded to receive the threads 26a of the end plugs or head members 26. The inner limits of the annular working chamber or cylinder is defined by the central shaft or rod 25, having reduced diameter end portions 25a rotatably mounted within the fixed end head portions 26 by the needle bearings 28. The ends of the rotatable shaft portions 25a are each provided with the arms or fins 27 which are attached to and move the aileron or control surface. The inner ends of the head portions 26 abut against the shoulders on the main shaft portions 25 to limit the same in the axial direction, and the adjacent surfaces of the head members are toroidal-shaped at 26c to define the ends of the torus-shaped annular chamber. An O-ring seal 23a is provided between each of the ends of the casing shell 23 and the head members 26 at the ends of the threaded portions 26a and a further O-ring seal is provided around the stepped down portions 25a of the central shaft 25. A retainer ring 28a threadedly engages the outer ends of each of the head members 26 to retain the needle bearings 28 in position, as well as the lubrication therefor.

As more particularly shown in Fig. 7, the actuator 23 comprises a four-chamber motor which is provided with a pair of fixed pistons or abutments 29 and 31 which are either integrally formed with the casing shell 23 as radial projections thereof, or may be furnace brazed or otherwise fixed or anchored thereto. The fixed piston or abutment 29 is comprised of two segmental portions each having torus-shaped ends and spaced apart in the rotational sense sufficiently to permit insertion of a freely floating carrier block 29a within a continuous elongated O-ring seal 29b which maintains the inner surface of the piston fluid-tight as the outer surface of the shaft 25 rotates against this surface. The elements of the fixed piston 29 are also each provided with the passageways or ducts 29c which conduct fluid from the pipes or conduits 9 and 9a to the chambers C and D, respectively. Similarly, on the opposite side of the actuator, there is a further two-part fixed piston or abutment 31 similarly spaced to receive a freely floating spacer disc or carrier element 31a within the continuous O-ring seal 31b. Each of the piston portions 31 is provided with fluid passages 31c which communicate or transfer fluid from the pipe 9 to the chamber E, and from the further pipe 9a to the chamber F.

The actuator is also provided with the movable piston portions 30 and 32 which are attached at their inner faces to the opposite sides of the central shaft 25. The piston portions 30 and 32 are also in two parts being spaced sufficiently to receive the intermediate carrier blocks 30a and 32a about which are carried the continuous O-ring seals 30b and 32b, respectively. As viewed in Fig. 7, it will be obvious that in order to impart clockwise rotation to the shaft 25 and corresponding rotation to the control surface, the fluid pressure is valved through the conduit 9a and into the opposite chambers D and F such that the movable pistons 30 and 32 as well as the attached shaft 35 are caused to rotate to the desired extent in the clockwise direction. At the same time, the fluid which is displaced from the opposite chambers C and E is caused to flow outwardly through the passages 29c and 31c into the conduits 9 which serve as the return or relief line, for this phase of its operation, to a suitable receiver or reservoir. It will also be apparent that in order to rotate the shaft 25 and the attached control surface in the opposite direction, it is merely necessary to reverse the direction of flow to cause fluid under pressure to be passed through the conduit 9 into the chambers C and E under which condition the displaced fluid is caused to pass from the chambers of decreasing volume D and F into the conduit 9a, which now serves as the return line.

In Fig. 8, there is shown a further modification of an end portion of an actuator of the four-chamber type having a fixed outer cylindrical casing 33 with a threaded and reduced diameter end portion within which is inserted the end or head fitting 36. Fixed wing arms or fins 34 are attached to the ends of the casing 33 and needle bearings 38 are interposed between the end rings 33b, retained to the shell 33 by the set screws 33a, and the rotatable ends, these bearings being retained by the retainers 38a, the end ring 33b serving also as the outer race for the needle bearings 38. The rotatable ends 36 are provided with external and internal O-ring seals 36a and 36b, respectively, and also with toroidal-shaped end faces 36c to define the ends of the annular working chamber. These end portions 36 are also threaded to receive the threads 35b of the reduced diameter end portions 35a of the rotatable shaft 35, the outer ends of which are attached to the aileron arms 37 which engage the splines 35d on the shaft ends and are retained thereon by the nuts 35c engaging the threads 35e. The stator or fixed portion of the actuator is similarly comprised of the fixed piston portions 39 and 40 attached to the casing 33 as in the case of the previous modification, having also the freely floating carrier blocks 39a and the O-ring seals 39b, as well as the blocks 40a and the O-ring seals 40b. As in the case of the previous modification, this actuator is also provided with a pair of movable pistons, such as the piston portions 41 provided with the intermediate O-ring seal 41a and a similar movable piston (not shown) attached to the opposite side of the shaft 35. This four-chamber actuator is similarly provided with fluid conduits and its operation is otherwise the same as that described in connection with Figs. 6 and 7.

It will, accordingly, be noted that very compact and efficient actuators have been shown and described which are particularly adapted for the operation of aircraft control surfaces within which they may be completely housed. Very efficient actuators have been designed having outside diameters of less than 2½ inches capable of developing torques well in excess of 15,000 inch pounds at fluid operating pressures of approximately 3000 p. s. i. While fins or arms have been shown fixedly attached to the stationary and rotatable portions of the actuators, it will be apparent that other suitable means for attachment of the actuator to fixed structure and to the member to be moved can be provided to suit the requirements of the particular installation. The efficiency of these actuators is contributed to appreciably by the continuous elongated O-ring seals which provide an unbroken seal within the elongated annular pressure chamber to make a fluid-tight joint while developing relatively little friction between the moving parts.

It will also be obvious that other forms and modifications of the present invention, both with respect to its general arrangement and the details of its several components, will occur to those skilled in the art after reading the foregoing description, but are all intended to come within the scope and spirit of this invention as more particularly set forth in the appended claims.

I claim:

1. In a fluid motor of the rotary type having a fixed cylindrical casing, torus-shaped head elements forming the ends of said casing, and a rotatable piston journalled within said casing head elements for rotation upon a longitudinal axis centrally disposed within said cylindrical casing, the improvement wherein a peripheral groove is formed wthin the edges of said piston and a seal for said rotatable piston comprising a continuous elongated O-ring carried within said peripheral groove formed within the edges of said rotatable piston in sealing engagement with the torus-shaped ends of said casing head elements and the interior cylindrical surface of said cylindrical casing.

2. A fluid actuator comprising a fixed cylindrical casing defining a working cylinder, apertured cylinder head elements fitted within the ends of said casing to define the length of said working cylinder, a central shaft element axially supported within said cylinder head elements defining an annular working chamber within said casing and said cylinder head elements, fixed piston means attached to said fixed casing extending radially into sealing engagement with said central shaft element, rotatable piston means fixed to said central shaft element and extending radially into sealing engagement with the interior surface of said cylindrical casing, the said piston means provided with torus-shaped end portions in sliding contact with complementary shaped internal surfaces on said cylinder head elements, said rotatable piston means comprising a pair of spaced radially extending projections, an elongated carrier block freely guided within the space between said piston projections and a continuous O-ring seal carried upon the periphery of said carrier block in engagement with said rotatable shaft, said fixed outer casing and said cylinder head elements to effectively seal fluid from passage across said piston.

3. In a fluid motor of the rotary type having a fixed cylindrical casing, torus-shaped head elements closing the ends of said casing, a central shaft element axially supported within said casing and said head elements, rotatable piston means journalled within said casing and said head elements for rotation upon a longitudinal axis centrally disposed within said cylindrical casing, said piston means comprising a pair of spaced radially extending projectons each fixedly attached to said central shaft element and having torus-shaped end portions, and seal means for said rotatable piston means comprising a continuous elongated O-ring carried within a peripheral groove formed within said piston means in sealing engagement with said cylindrical casing, said head elements and said shaft element.

4. A device for use to actuate one of two relatively movable components, a cylindrical casing for fixed attachment to a first of said components, a central shaft element axially supported within said cylindrical casing for fixed attachment to a second of said components, piston means fixedly attached to said central shaft element, bearing means carried internally of said cylindrical casing and a tubular element journalled for rotation within said bearing means, said tubular element attached to said piston means whereby said central shaft element and said piston means are rotatably mounted within said bearing means.

5. The invention according to claim 4 including fixed abutment means attached to said casing having an outer part-cylindrical surface slidably engaging said tubular element and an inner part-cylindrical surface slidably engaging said central shaft element.

References Cited in the file of this patent

UNITED STATES PATENTS

| Number | Name | Date |
|---|---|---|
| 1,566,075 | Cotton | Dec. 15, 1925 |
| 2,286,516 | Swanson | June 16, 1942 |
| 2,366,382 | Burton et al. | Jan. 2, 1945 |
| 2,540,903 | Moushey et al. | Feb. 6, 1951 |
| 2,559,817 | Ashkenas | July 10, 1951 |
| 2,675,679 | Parker | Apr. 20, 1954 |

FOREIGN PATENTS

| Number | Country | Date |
|---|---|---|
| 50,262 | Switzerland | Jan. 5, 1910 |